Nov. 17, 1959     A. SZEGVARI     2,913,115
VALVE MECHANISM, ETC., AND USE THEREOF
Original Filed May 24, 1950
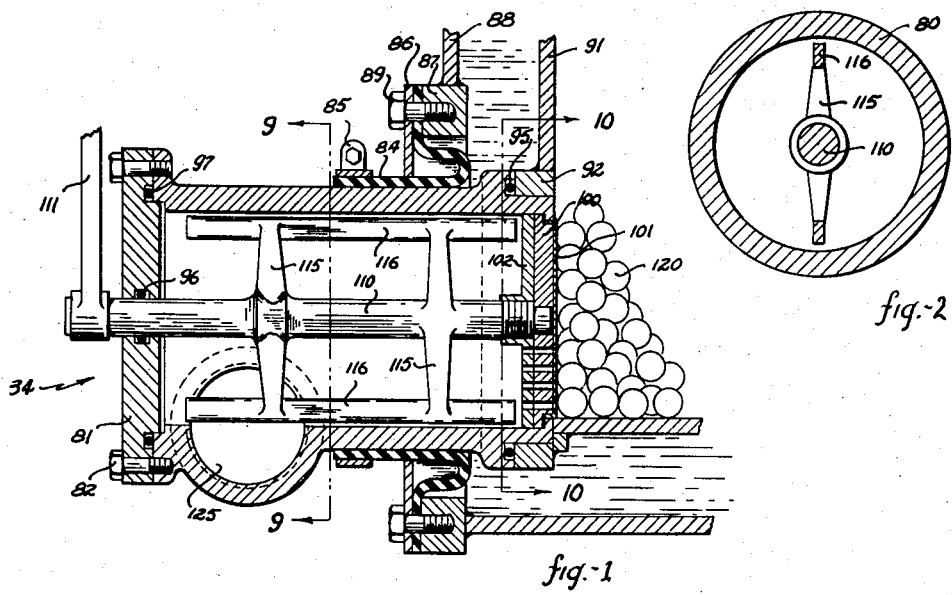
fig.-1
fig.-2
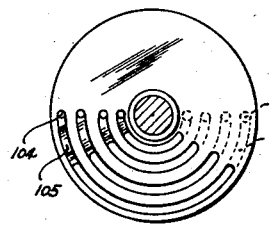
fig.-3a
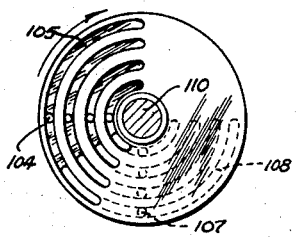
fig.-3b
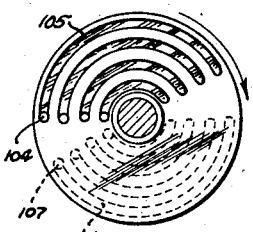
fig.-3c
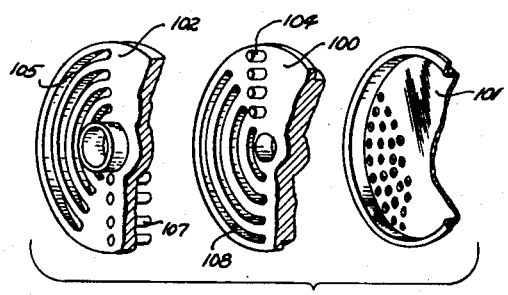
fig.-4
INVENTOR.
ANDREW SZEGVARI
BY
ATTORNEY

United States Patent Office

2,913,115
Patented Nov. 17, 1959

2,913,115

VALVE MECHANISM, ETC., AND USE THEREOF

Andrew Szegvari, Akron, Ohio

Original application May 24, 1950, Serial No. 168,837. Divided and this application July 10, 1956, Serial No. 596,957

5 Claims. (Cl. 209—379)

This invention relates primarily to a valve mechanism or the like, and the use thereof. It is designed primarily for use in connection with fine-grinding means, but is capable of other uses.

The device is used to separate relatively large elements, such as grinding elements, from a liquid in which solid matter has been finely divided and suspended. It separates the large elements from the suspension and provides for removal of any of the finely divided solid which may separate in openings in the device through which the suspension passes. The device may be used as a valve. It may be used in connection with other valve means.

The surface of the device with which the large elements come in contact is slotted. On the opposite side of the slotted means are pins which fit in the slots, and the two elements are made rotatable with respect to one another so that the pins remove deposits of the finely divided matter from the slots.

This application is a division of my application Serial No. 163,837, filed May 24, 1950, now U.S. Patent 2,764,359. In that application the device is used as valve means at the outlet of a vessel which contains large attritive elements which are agitated in the vessel. The device not only serves as a valve to control the flow of a liquid suspension of finely divided particles from the vessel, but, in addition, serves to retain the attritive elements in the vessel. Although this embodiment of the invention is illustrated in the drawings, the invention is capable of many other embodiments and uses.

For instance, it may be used merely to reinforce a thin screen which retains the attritive elements in the vessel described. It may be located in the wall of the vessel and used in conjunction with a valve spaced from the vessel. It will be apparent that for such use only one plate need be used and that this plate need not be provided with projecting pins. Instead of the second plate a series of the projecting pins with suitable supporting means is required. These pins must be located in the slots and the slots are advantageously made concentric with the pivotal means carrying the pins, although the slots may be straight. When a valve is employed, it is necessary that half of the plate provided with the slots be imperforate in order to block the flow of liquid through the slots, but when the device is not used as valve means but merely to provide uninterrupted flow through slots in a plate which reinforces the screen, the slots may continue through 360° or to an extent which approaches a complete circle as nearly as is feasible from an engineering standpoint.

Although the device is described more particularly for use in connection with a liquid system, it may be utilized in any fluid system. For example, it may be utilized to control the flow of a gas in which there are finely-divided solid particles which tend to settle out of the gas.

The invention will be further described in connection with the accompanying drawings, in which the device is employed as the outlet valve on a jacketed vessel containing many attritive elements and an agitator (not shown).

Fig. 1 is a section through the wall of a vessel and an outlet chamber with the valve means between the two;

Fig. 2 is a section on the line 9—9 of Fig. 1;

Figs. 3a, 3b and 3c are elevations on the line 10—10 of Fig. 1 showing the valve in open, partly open, and closed positions, respectively; and Fig. 4 is an exploded view showing the three essential parts of the valve, each partly broken away.

The valve structure is indicated generally by the reference numeral 34 in Fig. 1. It is designed especially to operate in concentrated liquid slurries which, because of settling, will rapidly clog a conventional valve. It satisfies the following requirements:

(a) There is no dead space between the inside of the vessel which contains the attritive elements and agitator, and the closing member of the valve, so that if the valve is closed no settling of the slurry can take place.

(b) The closure itself is constructed so that the operation involves automatic cleaning of the openings through which the liquid flows when the valve is open.

(c) The valve body itself is swept free from settled material by a built-in sweeping device which operates when the valve is operated.

The housing 80 is cylindrical. The end plate 81 is fastened onto it by the bolts 82. Gasket material 84 is held to the outer surface of the housing by the clamping ring 85. The outer end of it is located between the cover plate 86 and bosses 87 in the wall 88 of the jacket on the vessel. The plate 86 is fastened into the bosses by the bolts 89. The inner end of the valve slides into the opening in the wall of the vessel 91 bounded by the ring 92. This ring is welded to the wall 91. O-rings 95, 96 and 97 located between the wall 80 and the ring 92, and also at the outer end of the valve, prevent leakage.

The inner end of the valve housing is closed by the stationary plate 100. This is covered by the screen 101 which is likewise stationary. In close contact with the plate 100 is the rotatable valve head 102. Pins 104 in the end plate 100 fit into the circular grooves 105 in the valve plate 102. Pins 107 on the inner surface of the valve plate 102 fit into the grooves 108 in the end plate 100. The valve plate 102 is connected by the stem 110 with the valve handle 111. The webs 115 fastened to the stem 110, support the scrapers 116. As the valve handle 111 is turned the scrapers 116 prevent the accumulation of solid matter on the walls of the housing 80. Likewise, as the valve handle 111 is turned the valve plate 102 is rotated against the surface of the end plate 100. As the valve plate 102 is rotated the pins 104 and 107 clear away any deposit of solid matter which may form in the slots 105 and 108, respectively. The screen 101 prevents any of the attritive elements 120 (Fig. 1) from lodging against the slots 108.

The diameters of the respective openings in the screen 101 are the same as the respective diameters of the valve slots 108. Thus, the slots are small enough to prevent the attritive elements 120 from entering them. The purpose of the round orifices of the screen is to prevent elongated elements (such as might be formed by fracture or wear of the attritive elements) from lodging in the openings 108 and preventing rotation of the valve plate 102 with respect to the end plate 100. The screen 101 is necessarily thin so that any settling within the cavity represented by such orifice cannot take place. There is thus no possibility of these cavities becoming plugged. The plate 100 is thick and strong enough to withstand any pressure developed within the vessel to which the valve is attached and the mechanical action of the attritive elements. The slots 108 are, therefore, necessarily so deep that suspended matter can settle in them and plug the slots. The pins 107 remove any such potential deposit when the valve is turned. Thus, the valve is used in a liquid system in which there is suspended matter of two different sizes. It permits the passage of the fraction of the smaller sizes while excluding the fraction of the larger sizes, and it stays operative in spite of the tendency for deposit formation.

The pins 104 and 107 are in line with the slots 108 and 105, respectively, and are spaced a short distance from the end thereof. When the valve is closed the two plates overlap to this extent. Figure 3c shows the valve closed with the pins 104 moved to the ends of the slots 105, and in dotted lines it shows the pins 107 at the ends of the slots 108. When fully opened (Fig. 3a) the pins 104 (which are stationary) are located in the opposite ends of the slots 105. The pins 107 on the valve plate 102 are turned through an angle somewhat less than 180° and are in the ends of the slots 108. Over the greater part of their respective lengths the slots coincide and provide an opening through the valve. Liquid and suspended solid matter are circulated through these openings by a pump and connecting conduits. Figure 3b shows the valve only partially opened. The curved slots 105 and 108 coincide over only a small portion of the distance between the pins 104 and 107. Thus, this valve permits free flow of the liquid and suspended matter and prevents accumulation of such matter when the circulation of liquid ceases or is temporarily slowed down.

The suspension leaves the valve chamber through the opening 125.

The valve is designed to regulate the flow of the suspension from the vessel. The screen 101 prevents any of the attritive elements 120 or other material in the vessel from being lodged against the outer plate 100 and interfering with the movement of any of the pins 107 along any of the slots 108. The flow of the suspension is regulated by having the valve open or closed, or having it only partly open. The position of the valve may be changed while the agitator in the vessel is in motion, or when it is not in operation. Thus, a controlled volume of the suspension may be withdrawn continuously from the bottom of the vessel during the process of subdividing the suspended material and returned to the top of the vessel, with or without subjection to some treatment before return, such as heating, subjection to radiation, etc.

When the valve is closed, the slots 108 in the plate 100 are open to the interior of the vessel, and suspended matter may enter them and settle in them, thus plugging the slots. However, when the valve is opened, by turning the handle 111, the pins 107 travel through these slots removing the deposit of suspended particles.

When the valve is open and the liquid suspension is flowing through any superimposed portion of the slots, due to the depth of the slots suspended matter is apt to be deposited in them, particularly during any brief or prolonged interruption of the flow. Deposits may form in the slots of either or both plates. Such deposits are easily removed by turning the handle 111 and thus freeing the slots of all deposits without stopping the flow of the suspension any more than momentarily.

The vessel containing the attritive elements can be used for a multitude of different operations. Thus, it may be used for grinding pigments in a liquid in which the pigment particles are to be permanently suspended, or the particles may be separated from the liquid after the grinding has been completed. It may be used for mixing finely-divided particles. It may be used for hastening chemical reactions.

Although the valve plate 102 is described as movable and the end plate 100 as stationary, obviously either one may be rotatable with the other stationary, or both may be made rotatable in suitable apparatus. The screen 101 is optional. The webs 115 and scrapers 116 are not necessary, and any suitable type of housing or other equipment for conveying liquid suspensions may be employed.

The invention is covered in the claims which follow.

I claim:

1. A device for use in connection with fluids containing suspended particles which comprise a plate with a pivot point and a plurality of slots therethrough curved concentrically about the pivot point, an element, which element and the plate are relatively rotatable about the pivot point, said element including means for closing the slots, and a plurality of pins connected with said element at distances from the pivot point equal to the radii of the respective slots, the pins being located in the respective slots and adapted to be moved therealong when the plate and said element are rotated about the pivot relatively to one another.

2. Two contacting plates relatively rotatable about a pivot point, curved slots in each plate concentric with the pivot point, the radii of the different slots in the respective plates being the same, each slot being no more than 180° in extent and so located that the plates can be rotated to superimpose all of the slots in one plate on the slots in the other plate and also can be rotated so that the slots in each plate are blocked by unslotted portions of the other plate, and cleaning means projecting from each plate into each of the slots in the other plate and so positioned that when the cleaning means on one plate are located at one end of the slots in the other plate, the cleaning means on that other plate are located in the opposite ends of the slots in the first plate.

3. In combination with the plates of claim 2, a screen adjacent the exposed face of one of the plates.

4. Two contacting plates adapted to be rotated with respect to one another about a pivot point, each plate having therein a plurality of curved slots concentric with the pivot point, the radii of the slots in one plate being the same as the radii of the slots in the other plate, and projecting from the contacting face of each plate and adjacent one end of each slot a pin projecting into the slot of the same radius in the other plate, the pins on the respective plates being adjacent opposite ends of the slots, the distance from one end of a slot to the pin adjacent the opposite end of the slot being substantially 180° and no more.

5. In combination, a vessel for treating a sediment-depositing fluid suspension containing freely movable independent rounded elements substantially larger in diameter than the particles of the suspension, tubular means attached to the vessel for conveying the liquid suspension from the vessel, a screen across the path of the flow of the suspension from the vessel through said tubular means, which screen is adapted to retain the rounded elements on the side of the screen toward the vessel, on the opposite side of the screen and in the tubular means a valve which provides an arcuate slot-shaped opening adapted for the flow of the suspension therethrough longitudinally of the tubular means with arcuately movable means at the opening for dislodging sediment deposited therein from the suspension.

References Cited in the file of this patent

UNITED STATES PATENTS

| | | |
|---|---|---|
| 1,238,433 | Pedersen | Aug. 28, 1917 |
| 1,279,335 | Hardinge | Sept. 17, 1918 |
| 2,290,783 | Turpin | July 21, 1942 |

FOREIGN PATENTS

| | | |
|---|---|---|
| 216,795 | Great Britain | June 5, 1924 |
| 643,635 | Germany | Apr. 13, 1937 |